United States Patent [19]

Yuda

[11] 4,077,085
[45] Mar. 7, 1978

[54] STRAIN RELIEF GROMMET
[75] Inventor: Takuo Yuda, Yokohama, Japan
[73] Assignee: Nifco Inc., Tokyo, Japan
[21] Appl. No.: 701,834
[22] Filed: Jul. 1, 1976
[30] Foreign Application Priority Data
   Jul. 1, 1975   Japan ................ 50-91294[U]
[51] Int. Cl.² .................................... H01B 17/26
[52] U.S. Cl. ................................. 16/2; 174/153 G;
                        403/197; 403/41; 339/105
[58] Field of Search ............... 16/2, 108; 248/56;
        174/153 G, 152 G, 65 G; 339/103 B, 105;
                       403/197, 195, 41; 285/162, 159

[56]        References Cited
          U.S. PATENT DOCUMENTS

| 2,563,604 | 8/1951 | Hultgren | 174/153 G |
| 2,895,003 | 7/1959 | Rapata | 174/153 G |
| 2,974,186 | 3/1961 | Klumpp, Jr. | 16/2 X |

*Primary Examiner*—Andrew V. Kundrat
*Attorney, Agent, or Firm*—Jack R. Halvorsen; Robert W. Beart

[57]                ABSTRACT

A one-piece plastic strain relief grommet which comprises a female member having a flanged U-shaped head end face and a chamber for accommodating a stretched electrical conductor means, a male member adapted to fit within the chamber of the female member for distortion and locking engagement of said conductor therewith, and a connecting means for connecting said two members in the form of a unitary set. The two members remain in the form of a unitary set connected by the connecting without accidental separation from each other until the grommet is put to actual use.

4 Claims, 7 Drawing Figures

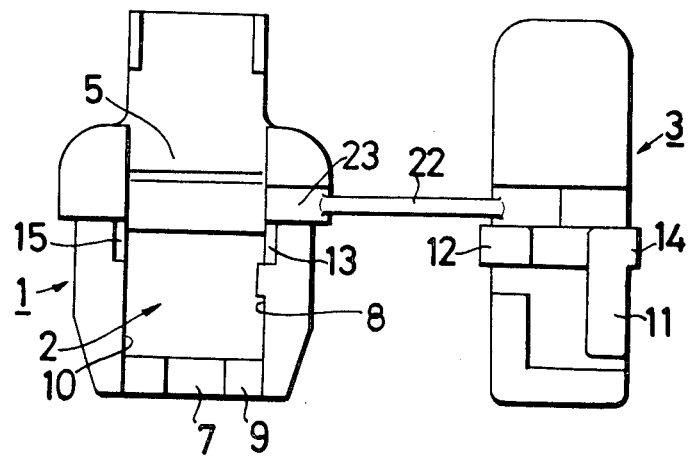
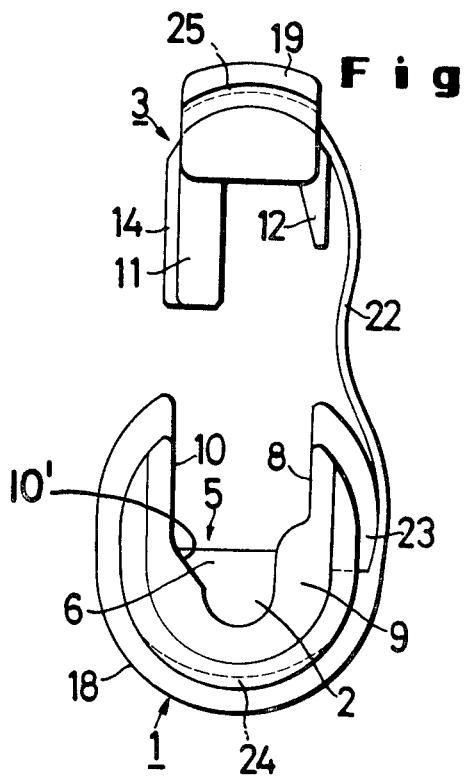
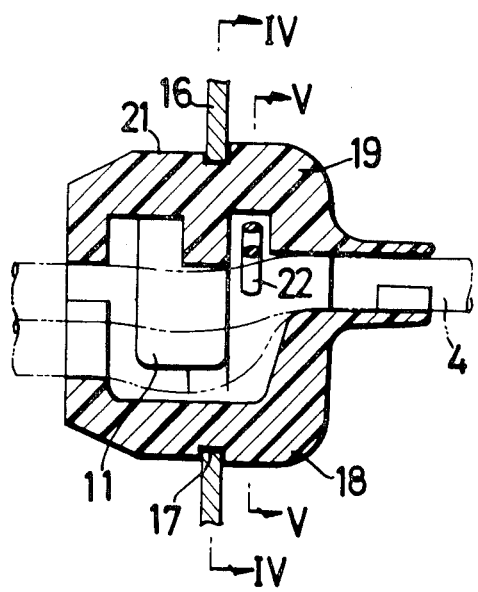

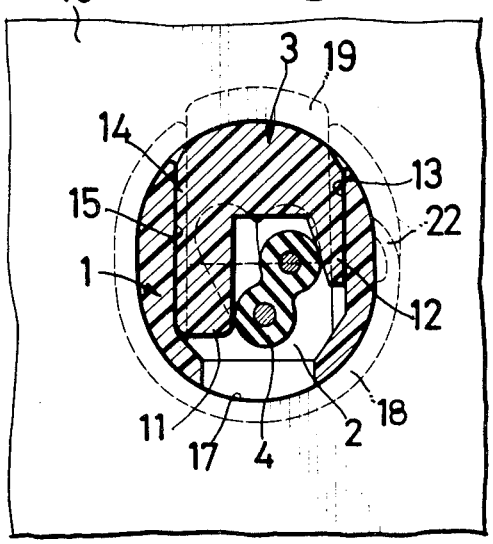
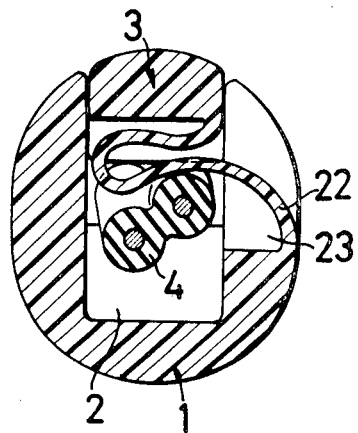
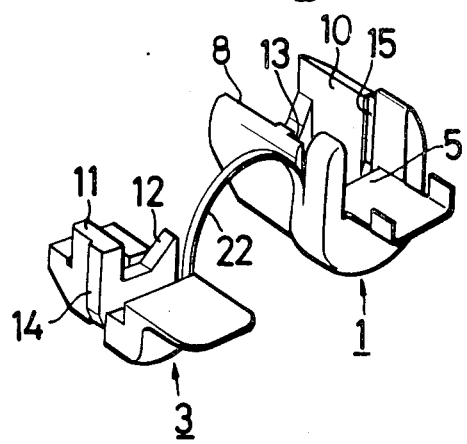
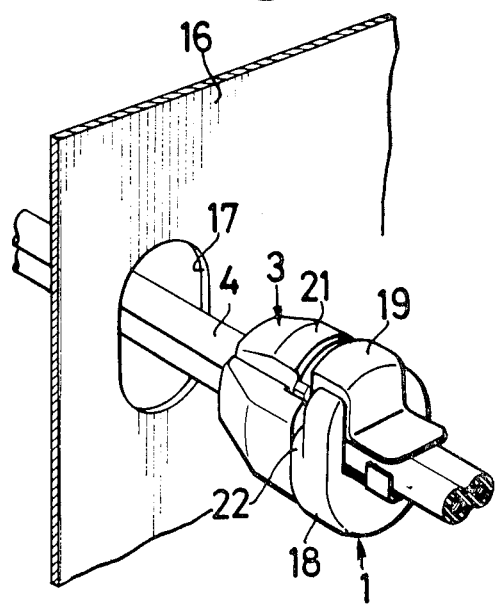

STRAIN RELIEF GROMMET

BACKGROUND OF THE INVENTION

The present invention relates to an improvement in a grommet of the type comprising two members, one male and one female, wherein said two members are attached in the form of a unitary set with a connecting means so that the two members remain in the form of a unitary set without being accidentally separated from each other until the grommet is put to actual use.

A grommet formed by combining two members, one male and one female, and adapted to fasten a conductor means in position by laying it between the two members and inserting the conductor means and the assembled grommet together into an aperture such as in a chassis, and a grommet having such two members connected into a unitary set by the medium of a connecting cord or hinge piece have already been known in the art. In the grommets of the types shown in U.S. Pat. No. 2,974,186 the connecting cords or hinge pieces serving to connect the two component members in their mutually embracing state are suffered to protrude from the outer surface of the assembled grommets. When such grommets are attached to apertures there inevitably ensues a disadvantage that such protruding cords or hinge pieces interfere with the work of attachment and at the same time spoil the outward appearance. In view of this disadvantage, attempts have been made to reduce the dimensions of the hinge piece serving to connect the two members so that the protrusion of such hinge piece from the surface of the grommet which inevitably occurs when the two members are joined with each other may be decreased. A reduction in the dimensions of the hinge piece, however, prevents the two members from being amply diverged when a cord is laid therebetween and consequently renders difficult the work of cord insertion therebetween. In the extreme case, the two members may fail to form an empty space large enough for passage of a cord therein.

One object of the present invention is to provide a grommet wherein the connecting means serving to connect the male and female members is of ample length to facilitate the work of connection of the two members and at the same time a slot is formed in such way in one side wall of the female member in a direction intersecting the barrel and communicating with the chamber thereof that when said two members are connected with each other, said connecting means will be received through said slot and consequently be folded internally of the chamber and between the two members to the extent of avoiding otherwise possible interference with the attachment of the grommet to the perforation and possible impairment of the appearance of the grommet.

SUMMARY OF THE INVENTION

To accomplish the object described above, the grommet according to the present invention comprises a female member having a flanged U-shaped head end face and a barrel-shaped body containing a chamber for accommodating a stretched electrical conductor means, such as a flat cord, and provided at one extremity of said chamber with an elevated wall rising from the bottom of said chamber and at the other extremity with a projecting wall extending inwardly from one side wall, a male member adapted to fit within the head and chamber of the female member for fast engagement therewith and a connecting means for connecting said two members in the form of a unitary set.

The connecting means serves to connect the male and female members until the engagement therewith and is received in a folded state between the two members and prevented from protruding outwardly when said two members are joined with each other. Thus, the connecting means avoids impairing the appearance of the assembled grommet.

Other features and advantages of the invention will be apparent from the following description taken in connection with the accompanying drawing wherein:

BRIEF DESCRIPTION OF THE DRAWING

FIG. 1 is a top view illustrating one preferred embodiment of the grommet according to the present invention.

FIG. 2 is a front view of the grommet of FIG. 1 in its disassembled state.

FIG. 3 is a longitudinal cross section view of the grommet of FIG. 1 in its assembled state.

FIG. 4 is a section taken on line IV—IV in FIG. 3.

FIG. 5 is a section taken on line V—V in FIG. 3.

FIG. 6 is a perspective view of the grommet in its disassembled state.

FIG. 7 is a perspective view of the grommet in its assembled state.

DETAILED DESCRIPTION OF THE INVENTION

The drawing represents a preferred embodiment of the grommet according to this invention. The grommet comprises a female member 1 and a male member 3 both formed of a thermoplastic synthetic resin. The two members are so constructed that they form a passage inside to receive an electrical conductor means such as a flat cord, when they are brought into mutual engagement.

The female member 1 has a flanged U-shaped head end face 18 and a body portion which contains a chamber or cavity 2 for receiving therein a cord 4. The cavity 2 is provided at one extremity thereof with an elevated wall 6 rising from the bottom of the U-shaped cavity and at the other extremity with a projecting wall 9 extending inwardly from one side wall of the cavity. When the male member 3 having a complementary flanged head end 19 and a body portion, is brought into engagement with the cavity 2 of female member 1 which has a generally U-shaped cross section, a laterally elongate horizonally disposed opening 5 is formed at the head end containing said elevated wall 6 and a longitudinally vertically disposed opening 7 is formed on the opposite end containing said projecting wall 9. In this construction, when a two-core parallel conductor cord 4 is fastened in position by the grommet of this invention, it is led out in a horizontal state from one of the openings, designated by the number 5 and in a vertical state from the other opening 7. That is, the cord is twisted by 90° within the passage formed inside the grommet.

In order that the engagement of the male and female members may take place in the proper position, they are provided with guide grooves 13 and 15 and a guide pieces 12 and 14 respectively so as to preclude possible movement of members 1 and 2 relative to one another and escape of the cord 4 in the longitudinal direction through slippage. Further, the male and female members are provided on the circumferential surfaces thereof with grooves 24 and 25 respectively so that when the two members are coupled and, in that state, thrust through the aperture 17 in the panel 16, such as of a chassis, the members will be undetachably fastened to the edge of said aperture 17 by grooves 24 and 25 and the head end flanges 18 and 19 of the two members 1 and 3, respectively.

The male member 3 is provided with a thrusting piece 11 adapted so that when the male and female members are brought into union, the thrusting piece will hang down along the side wall 10 opposite the side wall 8 constituting the base of the projecting wall 9 of the cavity 2 of the female member 1 and assume its position close to the opening 7.

Besides, a means, such as hinge means or cord 22, is stretched between the two members, one male and one female, for the purpose of connecting said two members of the aforementioned constructions into a unitary set. A slot 23 is formed in one side wall 8 of the female member for the purpose of guiding said connecting cord 22 between said two members when the two members are brought into a mutually embracing engagement.

The slot 23 in this particular embodiment is formed so as to longitudinally serve the side wall portion 8 having a flange 18 disposed thereon and then communicate with the cavity 2 so that said connecting cord 22 will be connected at one end to and extends from the bottom of the slot 23 and connected at the opposite extremity thereof with one edge of the male member to establish the desired connection between the two members. As will be described afterward, the slot 23 is formed to a depth greater than the depth to which the male member protrudes into the cavity 2 when the male and female members are joined with each other, for the purpose of facilitating the insertion of the connecting cord between the two members. At the same time, the connecting cord 22 is given a thickness smaller than the width of the slot 23 and having enough length for the two members to confront each other without exertion of excessive external force when the two members are brought into engagement.

Further, the connecting cord 22 is initially inwardly curved or bent at its middle portion as shown in FIG. 2, whereby the two members are advantageously engaged with each other because the connecting cord is automatically bent inwardly at the curved portion thereof and folded back upon when the two members are brought into engaged relation.

In this case, therefore, the cord 4 is laid over the cavity 2 of the female member 1 and the male member 3 and the female member 1 are engaged with each other in such way that the connecting means 22 is folded over upon itself as it is inserted between two members 1 and 3 through the slot 23 and the guide grooves 13 and 15 disposed opposite each other on the wall of the cavity of the female member are meshed with the guide pieces 12 and 14 on the male member. One side of the two-core parallel conductor cord is pushed down by the thrusting piece 11 and the folded connecting means 22 and caused to enter the vertical opening 7 while the cord on the opening 5 side is retained horizontally on the elevated wall 6. To facilitate the easy entrance of the cord 4 through the opening 7, the opening 7 of the female member is provided with an inclined projection 10' opposite the projecting wall 9.

Consequently, the twisting of the cord 4 within the grommet 1 is accomplished by simply bringing the male and female members into mutual engagement.

The male and female members, while pressed against each other and consequently kept in a joined state, are telescopically inserted through the aperture 17 bored in the panel 16 until the grooves 24 and 25 on the male and female members snap into fast engagement with the edge of the perforation 22. Then, the two members are released of the pressure. The elastic repulsion of the cord 4 and connecting means 22 causes the grommet to be fastened powerfully against the edges of the panel aperture.

The cord which has been so immobilized will not move even by slippage in the direction of the length and can enjoy effective fastening without being exposed to any powerful stress.

Thus the connecting means 22 inserted between the engaged two members in its bent state exerts pressure on the cord 4 twisted therebetween, whereby the grommet of this invention provides thorough retaining force to the cord 4 being laid therethrough.

As described above, the connecting cord 22 serving to connect the male and female members is received in a folded state between the two members and prevented from protruding outwardly when said two members are joined with each other. Thus, the connecting means, unlike the prior art, avoids impairing the appearance of the assembled grommet. Moreover since this connecting means is laid through the slot formed in the female member and received completely in the open space between the two members, the present invention proves to be highly advantageous in that the connecting means will never interfere with or impair the work of the insertion of the assembled grommet into the aperture in the panel.

Although the connecting means is disposed at the flange portion of the female member in the preferred embodiment so far described, the position at which the connecting means is disposed is not limited to said flange portion. For example, if the connecting cord is extended from a slot which is to be formed on the barrel body portion destined to slide along the edges of the aperture during the insertion of the grommet, it will not interfere with the insertion of the grommet into the aperture. This means that the connecting means can be disposed at any position insofar as the position permits formation of said slot.

The preferred embodiments so far described by way of illustration of the present invention have been considered as using grommets of a specific shape. Insofar as the invention is practiced in accordance with the aforementioned conditions, the shape of the male and female members is not specifically fixed. For example, the present invention can also be carried out with a grommet of the construction wherein a depression is formed in one of the two component members and a protrusion adapted to enter the depression is formed on the other member in such way that a cord laid between the depression and the protrusion is bent or kinked in a zigzagging state therein.

What we claim is:

1. A one-piece plastic strain relief grommet adapted for positioning in an apertured panel, said grommet including a female member having a flanged U-shaped head end and a chamber for accommodating an elongated electrical conductor means, a male member having a flanged head end complimentary to said female head end, said male member further having means for cooperatively distorting and locking said conductor means within said chamber, said female member being provided with a lateral slot communicating with said chamber through its side wall and a resilient foldable elongated connecting means integrally connected at opposite ends thereof to said female and male members, said connecting means being long enough for passage of the major portion thereof through said lateral slot in folded overlying relation to said conductor means when said male and female members are moved into juxtaposed locking relationship relative to said conductor means, whereby said connecting means is positioned internally of said grommet when positioned for mounting in said apertured panel.

2. A grommet of the type claimed in claim 1 wherein said conductor means is a generally flat element that is disposed in one plane as it enters said head ends of said members and is twisted about its axis as it progresses through said chamber to be disposed in a second plane as it comes out the opposite end, said connecting means being folded back upon itself within said chamber and bearing on said flat element to assist in the twisting thereof.

3. A grommet of the type claimed in claim 1 wherein said connector means is initially molded with a bend point intermediate its length to assist in said folding operation within said chamber.

4. A grommet of the type claimed in claim 1 wherein said lateral slot is disposed in the flanged head end of said female member.

* * * * *